(12) United States Patent
Yazaki et al.

(10) Patent No.: US 10,241,279 B2
(45) Date of Patent: Mar. 26, 2019

(54) CABLE GRIPPING STRUCTURE AND OPTICAL FIBER CONNECTOR

(71) Applicant: Corning Research & Development Corporation, Corning, NY (US)

(72) Inventors: Akihiko Yazaki, Tokyo (JP); Takaya Yamauchi, Sagamihara (JP)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 15/915,541

(22) Filed: Mar. 8, 2018

(65) Prior Publication Data

US 2018/0196203 A1 Jul. 12, 2018

Related U.S. Application Data

(63) Continuation of application No. 15/117,889, filed as application No. PCT/JP2015/056514 on Mar. 5, 2015, now abandoned.

(30) Foreign Application Priority Data

Mar. 5, 2014 (JP) .................................. 2014-043046

(51) Int. Cl.
*G02B 6/38* (2006.01)
(52) U.S. Cl.
CPC ......... *G02B 6/3887* (2013.01); *G02B 6/3806* (2013.01); *G02B 6/387* (2013.01); *G02B 6/3821* (2013.01); *G02B 6/3893* (2013.01)

(58) Field of Classification Search
CPC .... G02B 6/3887; G02B 6/3821; G02B 6/387; G02B 6/3893
See application file for complete search history.

(56) References Cited

U.S. PATENT DOCUMENTS

| | | | |
|---|---|---|---|
| 4,958,171 A * | 9/1990 | Fulton | B65H 31/08 347/158 |
| 5,048,920 A | 9/1991 | Newell | |
| 5,418,874 A * | 5/1995 | Carlisle | G02B 6/3887 385/139 |
| 5,566,269 A | 10/1996 | Eberle, Jr. et al. | |
| 6,285,815 B1 | 9/2001 | Daoud | |

(Continued)

FOREIGN PATENT DOCUMENTS

| FR | 2300850 A1 | 9/1976 |
|---|---|---|
| FR | 2300850 B1 | 10/1978 |

(Continued)

OTHER PUBLICATIONS

International Search Report for Appl. No. PCT/JP2015/056514, dated Apr. 17, 2015, 3 pp.

(Continued)

*Primary Examiner* — Peter Radkowski
(74) *Attorney, Agent, or Firm* — Adam R. Weeks (57) ABSTRACT

A cable gripping structure for securing an optical fiber cable in an optical fiber connector possesses a base part and a pair of support walls disposed opposite one another on the base part, and blade parts for gripping the optical fiber cable are disposed on the pair of support walls, at the tip ends thereof and separated from the bases of the support walls.

19 Claims, 6 Drawing Sheets

(56) References Cited

U.S. PATENT DOCUMENTS

| | | | |
|---|---|---|---|
| 6,325,549 B1* | 12/2001 | Shevchuk | G02B 6/3809 |
| | | | 385/76 |
| 6,695,491 B1 | 2/2004 | Leeman et al. | |
| 7,004,951 B2* | 2/2006 | Gibbens, III | A61B 17/0482 |
| | | | 606/144 |
| 7,070,078 B2 | 7/2006 | Song | |
| 7,272,291 B2 | 9/2007 | Bayazit et al. | |
| 7,338,504 B2* | 3/2008 | Gibbens | A61B 17/0482 |
| | | | 606/144 |
| 8,478,100 B2 | 7/2013 | Toda et al. | |
| 2003/0083674 A1* | 5/2003 | Gibbens, III | A61B 17/0482 |
| | | | 606/144 |
| 2004/0232287 A1 | 11/2004 | Rosemann et al. | |
| 2006/0111732 A1* | 5/2006 | Gibbens | A61B 17/0482 |
| | | | 606/145 |
| 2006/0251374 A1 | 11/2006 | Chou et al. | |
| 2007/0211997 A1 | 9/2007 | Saito et al. | |
| 2008/0170832 A1 | 7/2008 | Mullaney et al. | |
| 2008/0285933 A1 | 11/2008 | Vogel et al. | |
| 2009/0038824 A1 | 2/2009 | Nakamura | |
| 2012/0128312 A1* | 5/2012 | Toda | G02B 6/3806 |
| | | | 385/136 |

FOREIGN PATENT DOCUMENTS

| | | |
|---|---|---|
| JP | 2008-298922 A | 12/2008 |
| JP | 2009-288479 A | 12/2009 |
| JP | 2010-091639 | 4/2010 |
| JP | 2010-096838 A | 4/2010 |
| JP | 2010091639 A * | 4/2010 |
| JP | 2010-197553 | 9/2010 |
| JP | 2011-095454 | 5/2011 |
| JP | 2013-235069 | 11/2013 |
| WO | WO 2009/099738 | 8/2009 |
| WO | WO 2010/053003 | 5/2010 |
| WO | WO 2010/132187 | 11/2010 |

OTHER PUBLICATIONS

Supplemental European Search Report for EP Appl. No. 15758040.8, dated Sep. 13, 2017, 2 pp.

* cited by examiner

CABLE GRIPPING STRUCTURE AND OPTICAL FIBER CONNECTOR

BACKGROUND

Technical Field

An embodiment of the present invention relates to a cable gripping structure and optical fiber connector.

Related Art

In the past, it was known that, when installing optical fiber connectors on optical fiber cables of multiple different sizes of outside diameter, optical fiber holders were employed that could be affixed to the optical fiber connector. For example, an optical fiber holder is disclosed in Japanese Unexamined Patent Application Publication No. 2010-197553 (Patent Document 1) in which protrusions are formed in both walls of a void for accommodating an optical fiber cable, protruding from the wall surfaces toward the center thereof. With this optical fiber holder, when an optical fiber cable is inserted into the void in which the protrusions have been formed, the cable is gripped by the protrusions biting into the cable.

BACKGROUND DOCUMENTS

Patent Documents

Patent Document 1: Japanese Unexamined Patent Application Publication No. 2010-197553

OVERVIEW OF THE INVENTION

Problems to be Solved by the Invention

However, with the conventional optical fiber holder, in order for an optical cable to be gripped along an entire height direction, the protrusions formed in the wall surfaces were contiguously formed from the base of the wall surface to the tip thereof. In this case, the protrusions functioned as ribs, making it difficult for the pair of wall surfaces to deform. Additionally, when gripping a large diameter cable, the wall surfaces would deform completely from the base end. Therefore, when protrusions were designed for a small diameter cable, for example, there was a risk that it would be difficult to insert a large diameter cable. On the other hand, when protrusions were designed for a large diameter cable, there was a risk that it would be difficult to suitably grip a small diameter cable. Consequently, there was a demand for a cable gripping structure and optical fiber connector with improved operability that could suitably grip optical fiber cables of multiple various diameters.

SUMMARY

The cable gripping structure of an embodiment of the present invention is a cable gripping structure for securing an optical fiber cable in an optical fiber connector, which possesses a base part and a pair of support walls disposed opposite one another on the base part. Blade parts for gripping the optical fiber cable are disposed on the pair of support walls at tip ends thereof and separated from bases of the support walls.

In the cable gripping structure of such an embodiment, the blade parts for gripping the optical fiber cable are disposed at the tips of the support walls, separated from the bases thereof. Therefore, even in a situation in which a dimension between the blade parts has been set to be able to adequately grip a small-diameter optical fiber cable, if a large-diameter optical fiber cable is inserted, the blades need not bite greatly into the cable. Therefore, less force is required to insert the optical fiber cable than in cases wherein the blade parts are contiguously formed from the bases. In this way, the cable gripping structure can suitably grip optical fiber cables of multiple various diameters and operability can be improved.

Additionally, in another cable gripping structure embodiment, the blade parts can grip a first cable, as well as a second cable in which a dimension of a long side or short side in cross-section thereof is smaller than that of the first cable, and a length dimension of the blade parts is equal to or greater than the dimension of the long side in cross-section of the second cable and may be less than the dimension of the long side in cross-section of the first cable.

Additionally, in another cable gripping structure embodiment, the pair of support walls may possess a thin part, in which a wall thickness formed toward the tip end of the support wall is small, and a thick part, in which a wall thickness formed toward the base end of the support wall is greater than that of the thin part.

Additionally, in another cable gripping structure embodiment, a boundary part between the thin part and thick part may be formed between the base of the support wall and the blade part.

Additionally, the optical fiber connector of an embodiment of the present invention is an optical fiber connector into which an end of an optical fiber cable is installed, which is equipped with a connector body in which a mounting part is formed for mounting the optical fiber cable, and a cover part that couples with the mounting part. The mounting part is formed by at least one surface of a back end portion of the connector body being notched out. The cover part is equipped with a cable gripping structure, and is disposed to be rotatable relative to the mounting part so as to cover the mounting part.

Additionally, in another embodiment of the optical fiber connector of the present invention, a floor surface is provided in the mounting part opposite the tips of the support walls in the state with the cover part covering the mounting part, wherein a pressing part, capable of pressing the optical fiber cable, may be provided in the floor surface protruding from the floor surface and located between the pair of support walls in the state with the cover part covering the mounting part.

Additionally, in another optical fiber connector embodiment, a protruding part may be provided in the cover part between the pair of support walls, protruding from the base ends toward the tip ends thereof.

Effect of the Invention

According to an aspect of the present invention, optical fiber cables of multiple various diameters can be suitably gripped, while improving workability.

DETAILED DESCRIPTION

Embodiments of the present invention will be described in detail below, referring to the attached drawings. For convenience, substantially identical elements will be assigned the same reference numbers, and descriptions thereof may be omitted. Additionally, the terms "X-axis direction," "Y-axis direction," and "Z-axis direction" are for convenience, based on the illustrated directions.

Figure 1:
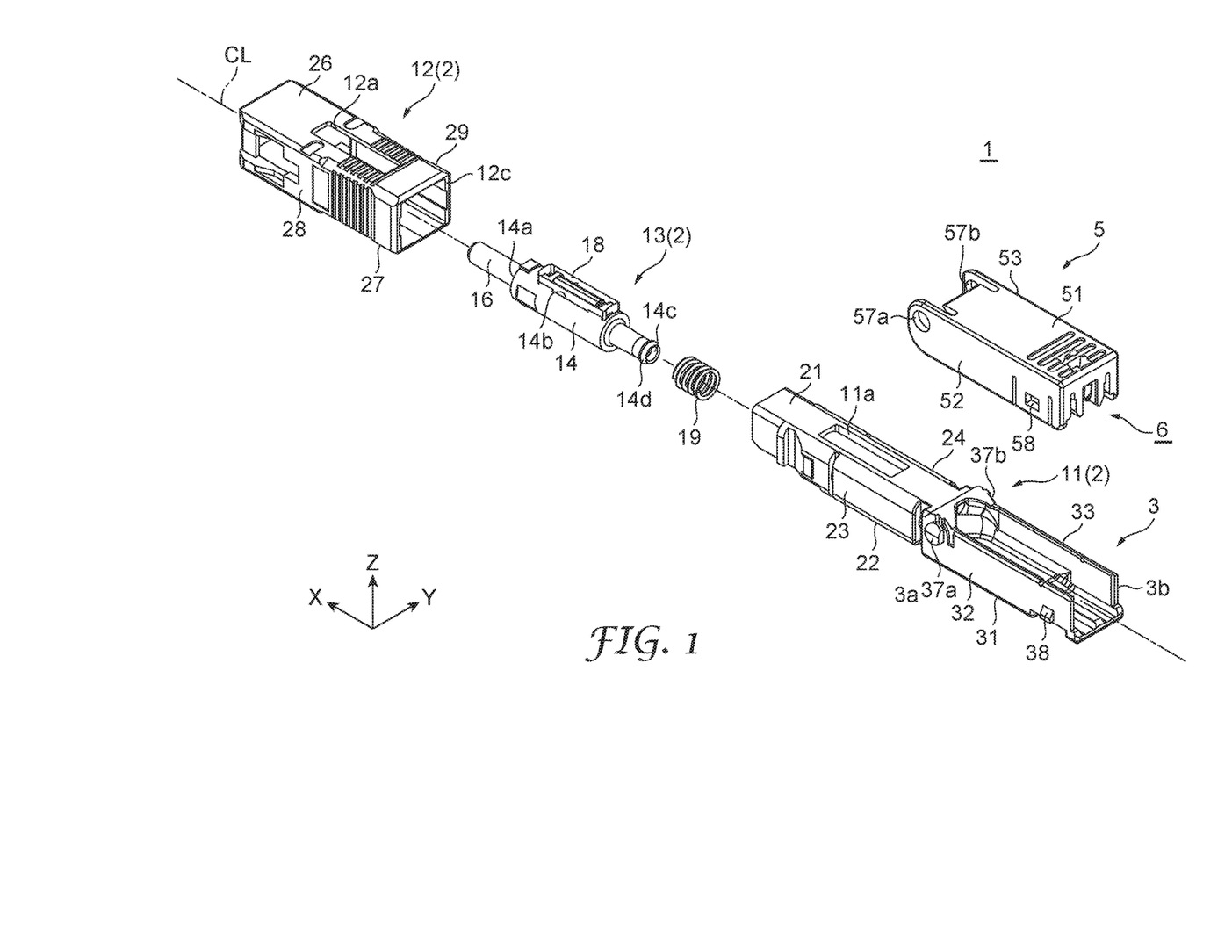
FIG. 1 is an exploded perspective view showing an optical fiber connector of an embodiment.
Figure 2:
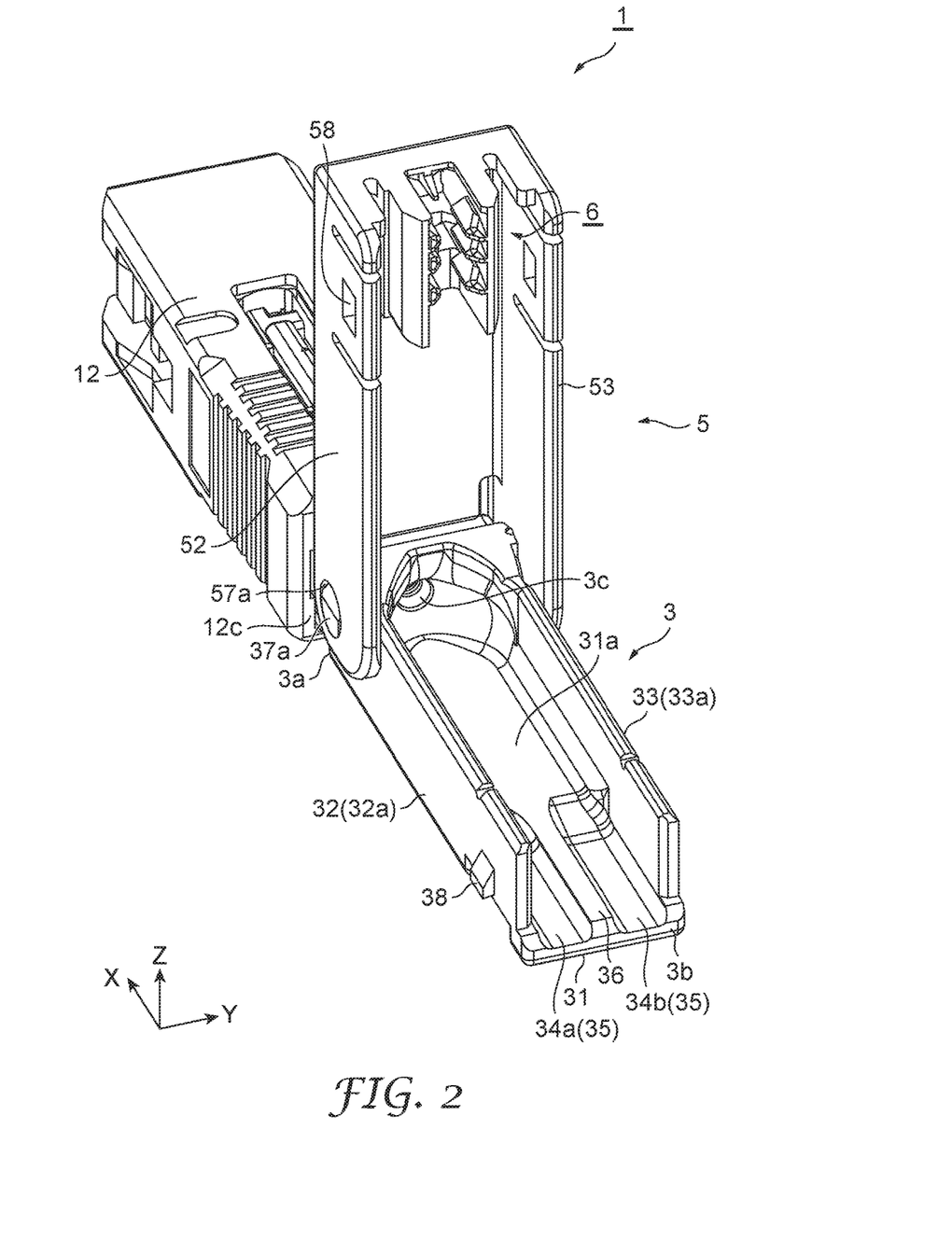
FIG. 2 is a perspective view showing an optical fiber connector in a state with the cover part open.
Figure 3:
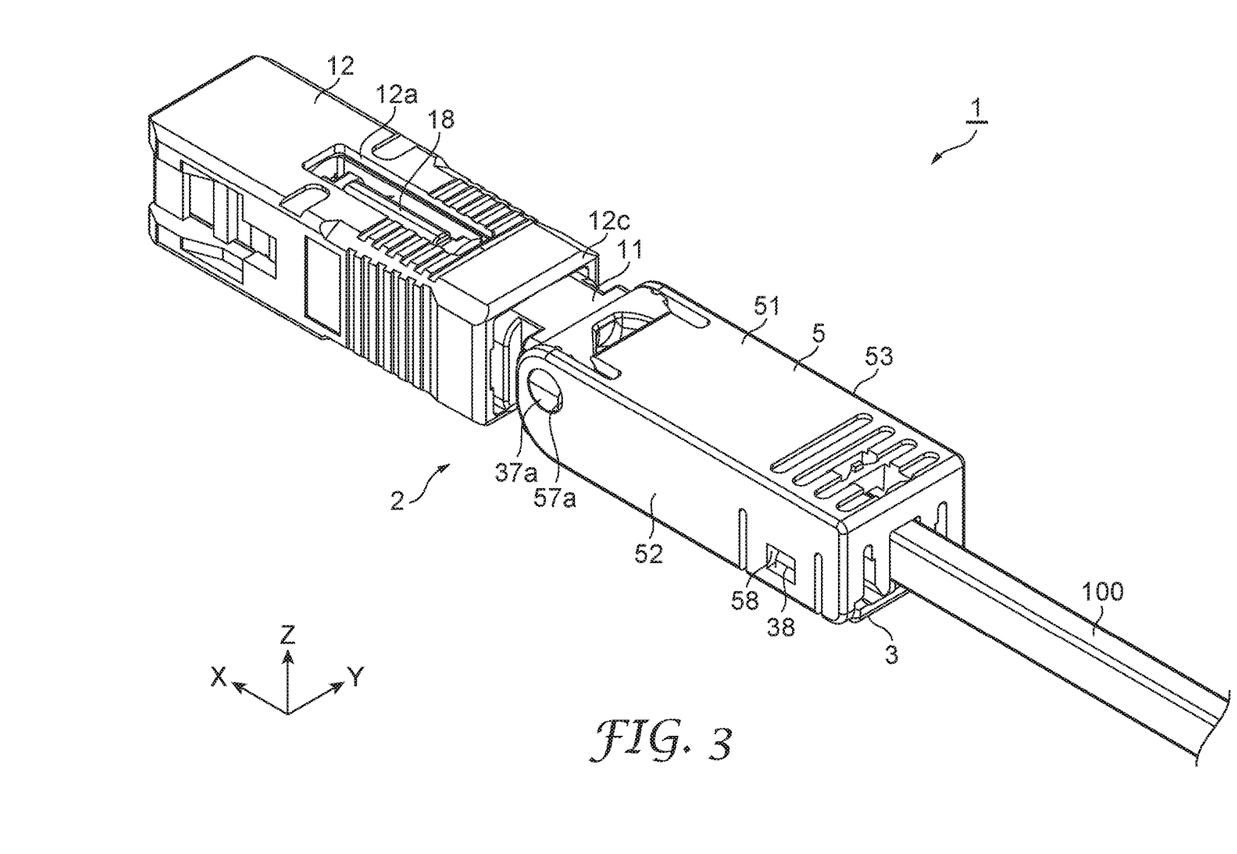
FIG. 3 is a perspective view showing an optical fiber connector in a state with the cover part closed.

FIG. 1 is an exploded perspective view showing an optical fiber connector 1 of the present embodiment. FIG. 2 is a perspective view showing the optical fiber connector 1 in a state with a cover part 5 open. FIG. 3 is a perspective view showing the optical fiber connector 1 in a state with an optical fiber cable mounted and the cover part 5 closed. As shown in FIG. 1 through FIG. 3, the optical fiber connector 1 is equipped with connector body 2, which is formed with a mounting part 3 at the back, in which the optical fiber cable 100 is mounted, and the cover part 5 that couples with the mounting part 3. Further, the lengthwise direction in which the optical fiber connector 1 extends shall be the "X-axis direction" for the purposes of explanation. In the present embodiment, the optical fiber connector 1 is installed at the tip of the optical fiber cable so that the optical fiber cable extends along the lengthwise direction in which the optical fiber connector 1 extends. Additionally, the thickness direction of the optical fiber connector 1 shall be the "Z-axis direction." The direction perpendicular to the X-axis direction and the Z-axis direction, namely, the width direction of the optical fiber connector 1, shall be the "Y-axis direction." Further, the tip end of the optical fiber connector 1 shall be the "front (positive X-axis end)," and the end in which the optical fiber cable is inserted shall be the "back (negative X-axis end)." Additionally, the side on which the operation of pressing on cap 18, described below, is performed shall be the "top (positive Z-axis side)," and the opposite side from that shall be the "bottom (negative Z-axis side)." Additionally, a central axis CL for the optical fiber connector 1 is set extending parallel to the X-axis direction. Unless specifically noted, members described in the present application possess a planar symmetric structure with the XZ plane through which the central-axis CL passes as the plane of reference.

The connector body 2 is equipped with a base part 11, a shell 12, and an optical fiber connector 13. The connector body 2 is constituted with the optical fiber connector 13 built into the base part 11, so that the outer circumference of the base part 11 is covered by the shell 12. Further, e.g., an SC-type optical connector may be used as the connector body 2. FC-type optical connectors, ST-type optical connectors, and LC-type optical connectors are considered as other examples thereof. The explanation in this Specification shall be given using an SC-type optical connector, but this SC-type optical connector is merely an example and the invention of the present application is not limited to this kind of connector.

The base part 11 is a rectangular tube-shaped member that extends in the lengthwise direction (X-axis direction), which is equipped with an upper wall 21 disposed on the top (positive Z-axis side), a floor wall 22 disposed on the bottom (negative Z-axis side), opposite the upper wall 21, and side walls 23, 24 opposing each other in the width direction (Y-axis direction). The shell 12 is a rectangular tube-shaped member that extends in the lengthwise direction, which is equipped with an upper wall 26 disposed on the top, a floor wall 27 disposed on the bottom opposite the upper wall 26, and side walls 28, 29 opposing each other in the width direction. The shell 12 fits onto the base part 11 so as to cover the outer circumferential surfaces thereof at the front end, with the upper wall 28, floor wall 27, and side walls 28, 29 of the shell 12 respectively covering the upper wall 21, floor wall 22, and side walls 23, 24 of the base 11.

The optical fiber connector 13 is equipped with a cylindrical collar 14 that extends in the lengthwise direction (X-axis direction) and a ferrule 16 that is disposed at a tip of 14a of the collar. The collar 14 possesses a through hole 14c at a back end 14d thereof for inserting an optical fiber that has been inserted from the back end of the connector body 2. Further, a spring 19 is disposed at the back end 14d of the collar 14, encircling the collar 14. This spring 19 exerts elastic force toward the connector tip end of the collar 14 inside the base 11, thereby keeping pressure on the ferrule 16 and maintaining contact with a ferrule that is built into another optical fiber connector that is to be coupled with the optical fiber connector 1. Further, an optical fiber introduction hole (not illustrated) is formed in the ferrule 16 along the central axis CL, and the connecting optical fiber (not illustrated) is inserted and secured in this optical fiber introduction hole. This ferrule 16 is coupled with the tip 14a so that the central axis aligns with the collar 14.

An open portion 14b is formed in the collar 14 that opens upward (Z-axis direction), and a core anchoring part (not illustrated) is accommodated inside the open portion 14b. Additionally, a cap 18 for pressing on the core anchoring part from above is disposed in the open portion 14b of the collar 14. Open portions 11a, 12a are respectively formed in the upper wall 21 of the base 11 and the upper wall 26 of the shell 12, at locations corresponding to the open portion 14b of the collar 14. Consequently, the cap 18 is in a state exposed through the shell 12.

The connecting optical fiber and the optical fiber in the optical fiber cable 100 that has been inserted from the back end of the connector body 2 are in a state abutted against, and optically connected to, one another in the core anchoring part. Inserting the cap 18 in this state anchors the optical fiber in the optical fiber cable 100 and the connecting optical fiber. In this Specification, the state of the optical fiber connector 1 being "installed" on the end of an optical fiber indicates a state in which the optical fiber has been anchored by connecting the connector body 2 to the optical fiber and coupling the cover part 5 with the mounting part 3, whereby the optical fiber connecter 1 has been completely attached to the end of the optical fiber and can be connected to another connector.

In the state in which the outer circumference of the base part 11 has been completely covered by the shell 12, the upper wall 21, which is one of the surfaces that constitutes the outer circumference, is notched out at the back end of the base part 11, and the mounting part 3, in which the optical fiber cable 100 is installed, is formed by the floor wall 31 and side walls 32, 33.

The mounting part 3 is for mounting an optical fiber cable 100 that is disposed along the lengthwise direction of the mounting part 3, wherein the optical fiber cable 100 is disposed at the back end 3b and the optical fiber is disposed at the front end 3a with the cladding of the optical fiber cable 100 removed. The mounting part 3, as shown in FIG. 2, has a U-shape in cross-section, which is open in the upward direction, extending rearward in the lengthwise direction from a back end 12c of the shell 12 of the connector body 2. The mounting part 3 is equipped with a floor wall 31 disposed on the bottom and side walls 32, 33 opposing each other in the width direction. A pair of grooves 34a, 34b are formed on the left and right, leaving a center portion, toward the back in the floor wall surface 31a on the upper surface of the floor wall 31. In other words, if these grooves 34a, 34b are considered the floor surface 35, the floor surface 35 has a shape toward the back of the floor wall surface 31a in which the center portion protrudes upward in the left and right directions. The protruding portion constitutes a pressing part 36, described below. An insertion hole 3c is formed at the back end 3a side of the mounting part 3 that communicates to the core anchoring part, so that an optical fiber installed in the mounting part 3 is inserted passing therethrough. Shaft parts 37a, 37b for rotatably connecting the cover part 5 are formed toward the front end side on the outer wall surfaces 32a, 33a of the side walls 32, 33. Additionally, a pair of latch parts 38 for coupling the mounting part 3 and the cover part 5, when the mounting part 3 is in a state covered by the cover part 5, are formed toward the back end in the outer wall surfaces 32a, 33a (the latch part in the outer wall surface 33a is not illustrated). The latch parts 38 are provided protruding outward from the outer wall surfaces 32a, 33a.

As shown in FIG. 1 through FIG. 3, the cover part 5 is for anchoring the optical fiber cable 100 in the optical fiber connector 1 when in the state coupled with the mounting part 3 and covering the mounting part 3 from above. The cover part 5 is equipped with a rectangular plate-shaped upper wall 51 and side walls 52, 53 that are disposed on either side in the horizontal direction of the upper wall 51, and possesses a cable gripping structure 6 between the side walls 52, 53 for gripping an optical fiber cable 100. Circular through holes 57a, 57b are formed corresponding to the shaft parts 37a, 37b on the mounting part 3 at one end in the lengthwise direction of the side walls 52, 53. Fitting the through holes 57a, 57b of the cover part 5 onto the shaft parts 37a, 37b on the mounting part 3 rotatably couples the cover part 5 to the mounting part 3. Additionally, latch receptacles 58 are formed as rectangular through holes corresponding to the latch parts 38 on the mounting part 3 at the other end side in the lengthwise direction of the side walls 52, 53. Fitting the latch parts 38 on the mounting part 3 into the latch receptacles 58 on the cover part 5, which has been coupled to the mounting part 3, creates a state in which the mounting part 3 is covered by the cover part 5. In the state in which the cover part 5 is thus coupled with the mounting part 3, the cover part 5 has a U-shape in cross-section, which is open in the downward direction.

Figure 4:
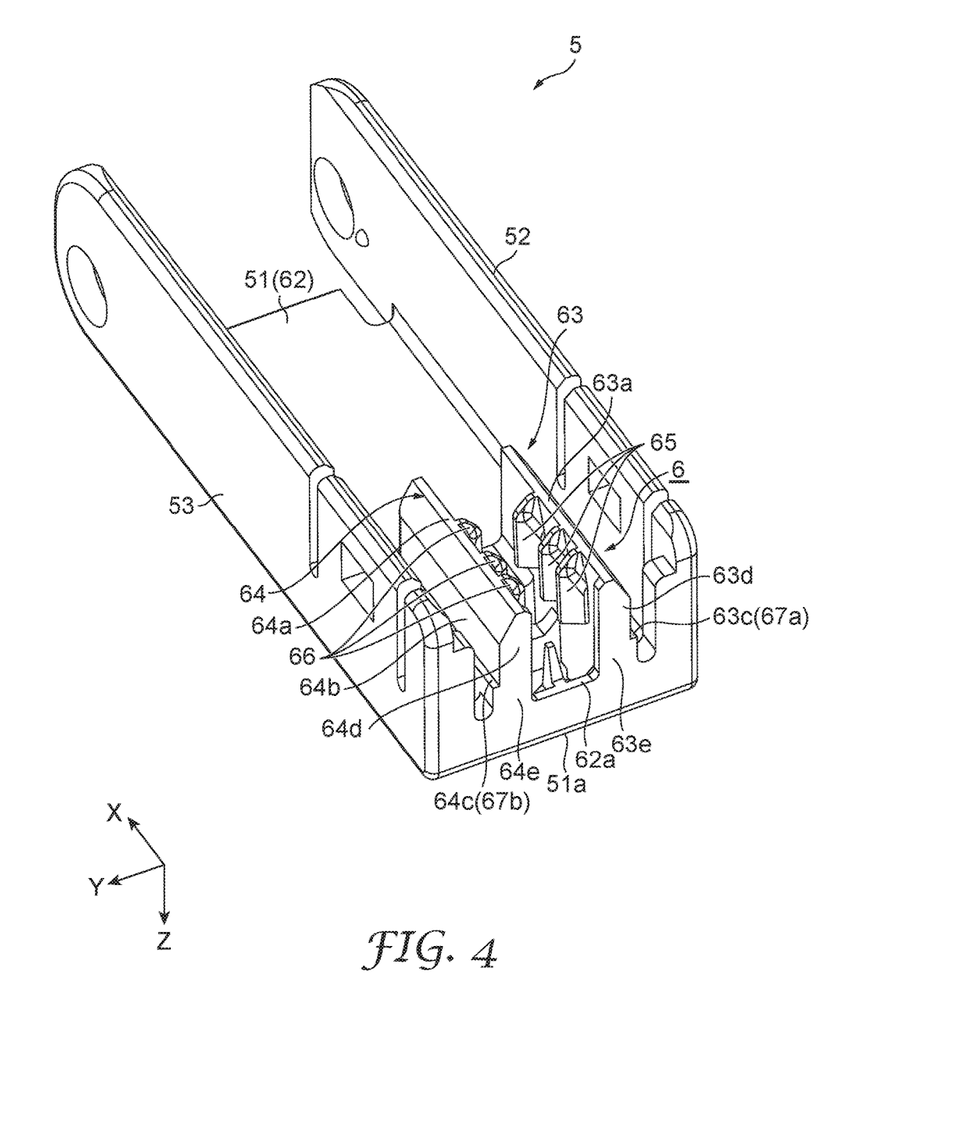
FIG. 4 is a perspective view showing the cover part.
Figure 5A:
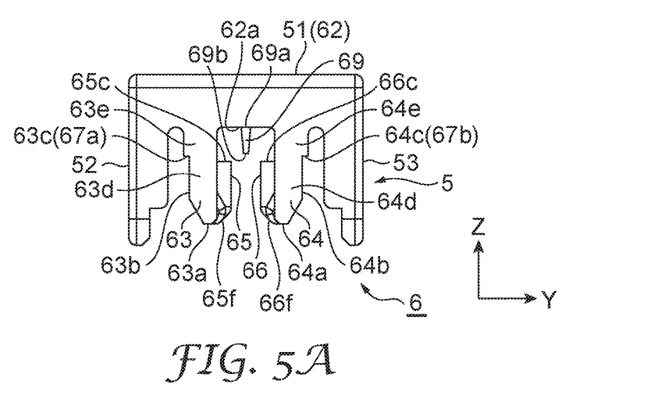
FIG. 5(a) is an elevation view of the cover part.
Figure 5B:
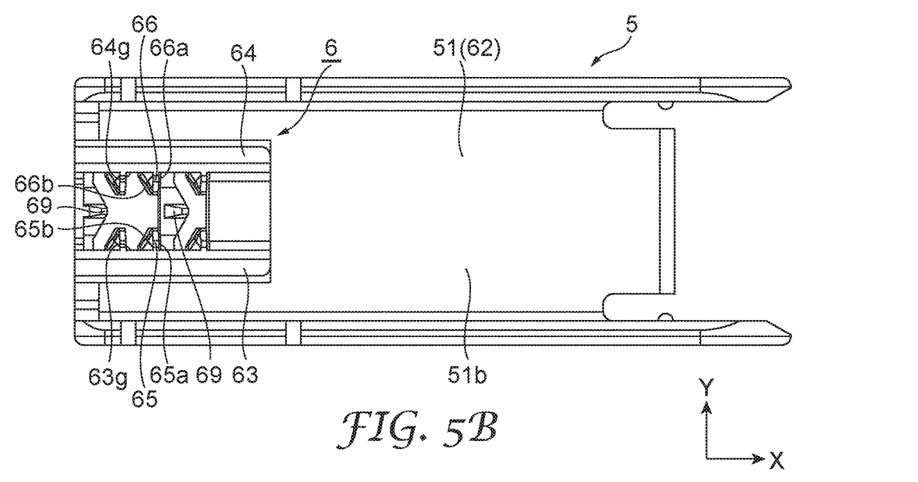
FIG. 5(b) is a bottom view of the same.
Figure 5C:
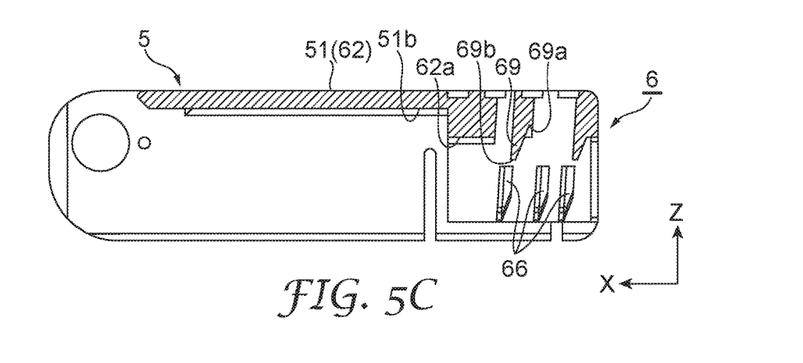
FIG. 5(c) is a cross sectional view of the same.

FIG. 4 is a perspective view showing the cover part 5. Additionally, FIG. 5(a) is an elevation view of the cover part, FIG. 5(b) is a bottom view of the same, and FIG. 5(c) is a cross sectional view of the same. In the description of the cover part 5, based on the state in which the cover part 5 and the mounting part 3 are coupled, with the cover part 5 covering the mounting part 3 (see FIG. 3), the X-axis direction of the cover part 5 in this configuration shall be the "lengthwise direction," the positive X-axis direction shall be the "front," and the negative X-axis direction shall be the "back." Additionally, in this configuration, the Z-axis direction shall be the "height direction," and the positive Z-axis direction shall be "up," while the negative Z-axis direction shall be "down."

As shown in FIG. 4 and FIG. 5, the cable gripping structure 6 formed in the cover part 5 is equipped with a pair of support walls 63, 64, provided with a base part 62 as the base end thereof, and blades 65, 66 that are formed toward tip ends 63a, 64a of the support walls 63, 64. Further, the area toward the back end 51a of the upper wall 51 is constructed as a base part 62. Additionally, the portion of the base part 62 between the support walls 63, 64 is formed to protrude from the inner surface 61b of the upper wall 51 toward the tips 63a, 64a of the support walls 63, 64. Further, the tip end in this protruding portion is described below, where it will be referred to as "edge 62a of the base part 62." The support walls 63, 64 are formed protruding from the base part 62 toward the back end of the cover part 5 between the side walls 52, 53, and are disposed facing one another so as to be parallel with the side walls 52, 53. Step parts 63c, 64c are formed at a specified location in the height direction, extending in the lengthwise direction, on the outer surfaces 63b, 64b of the support walls 63 64. The tip 63a, 64a ends of the support walls 63, 64 constitute thin parts 63d, 64d with a smaller wall thickness (thickness in the Y-axis direction), and the base ends (toward the base part 62) of the support walls 63, 64 constitute thick parts 63e, 64e with a greater wall thickness, where this step part 63c, 64c constitutes the boundary 67a, 67b therebetween. In the present embodiment, the step parts 63c, 64c are formed below the midpoint in the height direction of the support walls 63, 64.

As shown in FIG. 5(b), blades 65, 66 are formed protruding in the Z-axis view from inner surfaces 63g, 64g of the support walls 63, 64. In the present embodiment, three blades 65, 66 are respectively formed aligned at intervals in the lengthwise direction on the inner surfaces 63g, 64g of each of the support walls 63, 64, but there may be more or fewer than three. The front surfaces 65a, 66a of the blades 65, 66 (the surfaces toward the front in the state in which the mounting part 3 and cover part are linked together) are formed perpendicular to the support walls 63, 64, and the back surfaces 65b, 66b of the blades 65, 66 (the surfaces toward the back in the state in which the mounting part 3 and cover part are linked together) are formed inclined toward the front. Thus, the gripping strength against pulling out the optical fiber cable 100 in the lengthwise direction is increased by the blades 65, 66 having a roughly triangular shape viewed in the Z-axis direction, with a right angle formed on the front side. Additionally, as shown in FIG. 5(a), the blades 65, 66 are disposed at the tips 63a, 64a of the support walls 63, 64, separated from the base ends thereof. Specifically, the blades 65, 66 extend in the vertical direction from a specified height away from the base 62 (edge 62 of the base 62) to the tips of the support walls 63, 64. The edge 62a of the base 62 (i.e., the base end of the support wall 63, 64) and ends 65c, 66c on the base 62 end of the blades 65, 66 are separated from one another. Additionally, the blades 65, 66 are provided with inclined parts 65f, 66f toward tips 63a, 64a of the support walls 63, 64 that incline so that the gaps therebetween increase. This facilitates the insertion of an optical fiber cable 100 between the blades 65, 66 from the tips of 63a 64a of the support walls 63, 64. In the present embodiment, boundary 67a, 67b between the thin part 63d, 64d and thick part 63e, 64e (step 63c, 64c) is formed at a height position between the base end of the of the support wall 63, 64 and the end 65c, 66c of the blade 65, 66 on the base 62 end (in the height range where the blades 65, 66 are not formed on the support walls 63, 64), but may also be formed at the same height position of the end of the blades 65, 66 on the base 62 end or a position slightly above this.

Additionally, a protrusion 69 is provided in the base 62 of the cover part 5, protruding between the pair of support walls 63, 64 from the base toward the tip end thereof. The protrusion 69 is to steadily support the optical fiber cable 100 in cases in which a small-diameter optical fiber cable 100 is being gripped by the blades 65, 66, and at least two are provided at an interval in the lengthwise direction in the present embodiment. The protrusion 69 is provided protruding from a surface that is a step lower than the edge 62*a* of the base 62. The protrusion 69 is angled toward the front from the base 69*a* to the tip 69*b* thereof. Therefore, in the case of a large-diameter optical fiber cable 100, the protrusion 69 will be easily deformed toward the front when pressed by the optical fiber cable that has been inserted.

Next, the conditions will be described, referring to FIG. 6, in which optical fiber cables 100 have been installed in the cable gripping structure 6 in the optical fiber connector 1.

Cases of installing a large-diameter optical fiber cable (first cable) 101 and a small-diameter optical fiber cable with smaller dimensions of the long side and short side in cross-section than the large-diameter optical fiber cable (second cable) 102 will be described herein. The dimensions of the long side 101*a* and short side 101*b* in the cross section of the large-diameter optical fiber cable 101 are, e.g., approximately 3 mm and approximately 2 mm, and the dimensions of the long side 102*a* and short side 102*b* in the cross section of the small-diameter optical fiber cable 102 are, e.g., approximately 2 mm and approximately 1.6 mm. In the present embodiment, the length dimension of the blades 65, 66 is equal to or greater than the dimension of the long side 102*a* in cross-section of the small-diameter optical fiber cable 102 and less than the dimension of the long side 101*a* in cross-section of the large-diameter optical fiber cable 101. Further, the length dimension of the blades 65, 66 is the dimension from the end 65*c*, 66*c* on the base 62 side of the blade 65, 66 to the tip 65*d*, 66*d* thereof, and includes the length of the inclined part 65*f*, 66*f*.

Figure 6A:
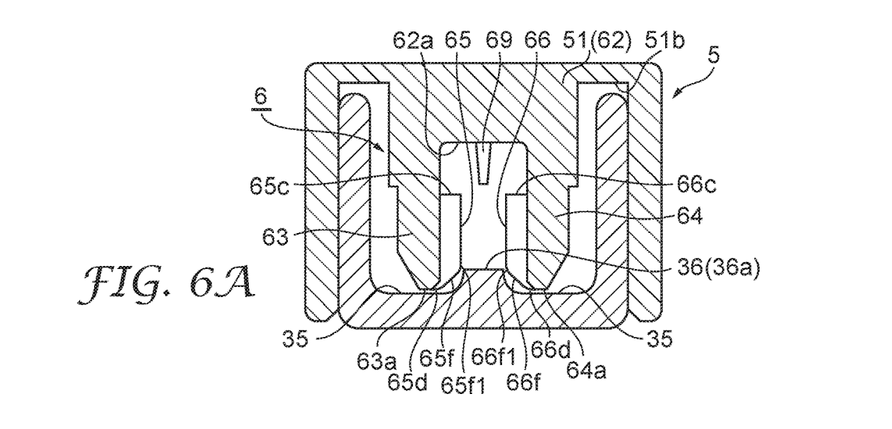
FIG. 6(a) through FIG. 6(c) are cross sectional views showing the state with the mounting part and cover part coupled.
Figure 6B:
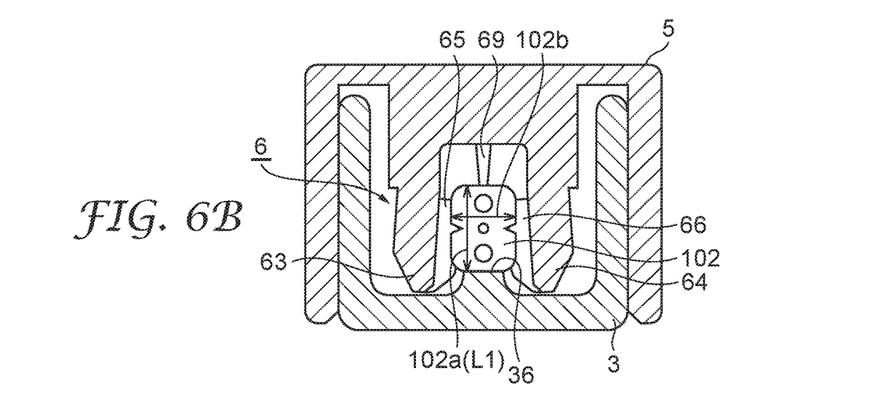
Figure 6C:
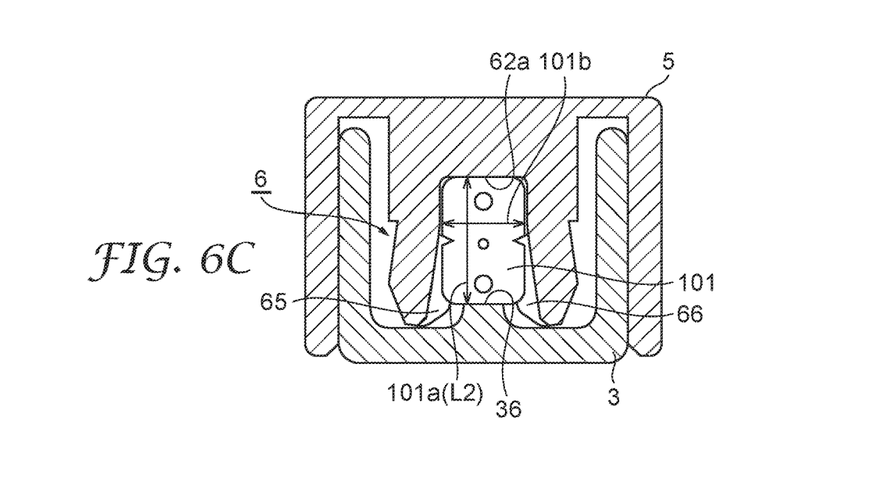

FIG. 6(*a*) through FIG. 6(*c*) are cross sectional views that schematically show the state with the mounting part 3 and cover part 5 coupled (state with the cover part 5 covering the mounting part 3). FIG. 6(*a*) is the state in which an optical fiber cable 100 is not being gripped. As shown in FIG. 6(*a*), in the state with the mounting part 3 and cover part 5 coupled, the floor surface 35 of the mounting part 3 and tips 63*a*, 64*a* of the support walls 63, 64 are opposite each other, and the pressing part 36 protruding from the floor surface 35 is positioned between the support walls 63, 64. In this state, the height position of the upper end 36*a* of the pressing part 36 is roughly the same position as the height of base side end 65*f*1, 66*f*1 of the inclined part 65*f*, 66*f*. Additionally, in the present embodiment, a distance L1 from the upper end 36*a* of the pressing part 36 to the edge of the protrusion 69 is roughly equal to the dimension of the long side 102*a* in cross-section of the small-diameter optical fiber cable 102, and the distance L2 from the upper end 36*a* of the pressing part 36 to the base 62 is roughly equal to the dimension of the long side 101*a* in cross-section of the large-diameter optical fiber cable 101 (see FIG. 6(*a*) and FIG. 6(*b*)).

FIG. 6(*b*) shows a state in which a small-diameter optical fiber cable 102 has been gripped, that is, a state is shown where the cover part 5 and mounting part 3 are coupled in a state in which the small-diameter optical fiber cable 102 has been disposed on the pressing part 36. As shown in FIG. 6(*b*), the optical fiber cable 102 is gripped by the blades 65, 66, which bite into the left and right long sides 102*a* of the optical fiber cable 102. With the operation of coupling the cover part 5 and the mounting part 3, the optical fiber cable 102 is pinched by the pressing part 36 and the blades 65, 66. At this time, the optical fiber cable 102 touching the blades 65, 66 is relatively pressed toward the blades 65, 66 by the pressing part 36. Thus, the optical fiber cable 102 is gradually pressed on by the pressing part 36, and thereby pushed into a specified position between the blades 65, 66. When this kind of pressing operation is performed, it becomes difficult for an operator to press if more than 70 N of force is required. In the present embodiment, the force required for this compression (the operation of coupling the cover part 5 and the mounting part 3) is around 40 N. In the state with the cover part 5 and mounting part 3 coupled, the protrusion 69 comes in contact with the optical fiber cable 102, preventing the optical fiber cable 102 from shifting out of position. In the state in which the optical fiber cable 102 has been gripped, the support walls 63, 64 are pushed slightly apart in the width direction by the optical fiber cable 102. At this time, the drawing force required to pull the optical fiber cable 102 in the lengthwise direction is, e.g., around 30 N.

FIG. 6(*c*) is the state in which a large-diameter optical fiber cable 101 has been gripped, that is, a case is shown where the cover part 5 and mounting part 3 are coupled in a state in which the large-diameter optical fiber cable 101 has been disposed on the pressing part 36. As shown in FIG. 6(*c*), the optical fiber cable 101 is gripped by the blades 65, 66 toward the bottom of the long sides 101*a* of the optical fiber cable 101. As in the case of the optical fiber cable 102, the operation of coupling the cover part 5 and the mounting part 3 gradually presses the optical fiber cable 101 with the pressing part 36, until it is pushed all the way to the base 62. At this time, the protrusion 69 formed in the base 62 is pressed and bent by being pressed by the optical fiber cable. Thus, in the state with the cover part 5 and the mounting part 3 coupled, the blades 65, 66 bite into the optical fiber cable, which is also supported by the pressing part 36 and base 62. In the state with the optical fiber cable being gripped, the support walls 63, 64 are more widely spread apart by the optical fiber cable than in the case with the smaller diameter, but the optical fiber cable is gripped along the entirety of the blades 65, 66. In the present embodiment, the compression force required to install a large-diameter optical fiber cable 101 is around 50 N. Additionally, the drawing force required to pull the optical fiber cable 101 in the lengthwise direction is around 40 N.

Next, the actions and effects of the cable gripping structure and optical fiber connector 1 of the present embodiment will be described.

For example, a cable gripping structure will be considered in a comparative example in which the ends 65*c*, 66*c* of the blades 65, 66 extended to the edge 62*a* of the base 62, and were connected to the edge 62*a*. In the cable gripping structure of such a comparative example, if the dimension between blades 65, 66 were set to match a small-diameter optical fiber cable, when a large-diameter optical fiber cable is pressed between the blades 65, 66, it is necessary for the blades 65, 66 to substantially bite into the optical fiber cable 101 and, as a result, the force necessary to insert the optical fiber cable 101 between the blades 65, 66 increases. On the other hand, in a case in which the dimension between the blades 65, 66 were set to match the large-diameter optical fiber cable 101, so that the blades 65, 66 do not bite greatly into the optical fiber cable 101 and the cable can be inserted with appropriate pressing force, sufficient gripping strength for a small-diameter optical fiber cable 102 can not be ensured.

In contrast, in the cable gripping structure 6 of the present embodiment, the blades 65, 66 for gripping the optical fiber cable 100 are set toward the tips 63a, 64a of the support walls 63, 64, separated from the base ends (base 62) thereof. Therefore, even in a state in which the dimension between the blades 65, 66 has been set to be able to sufficiently grip a small-diameter optical fiber cable 102, the blades 65, 66 do not have to bite greatly into the optical fiber cable 101 when a large-diameter optical fiber cable is inserted, decreasing the force needed to insert the optical fiber cable compared to a case in which the blades are formed contiguously from the base. Thus, this cable gripping structure 6 can adequately grip optical fiber cables of multiple various diameters, improving operability.

The blades 65, 66 in the cable gripping structure 6 of the present embodiment can grip both large-diameter optical fiber cables 101 and small-diameter optical fiber cables 102, and the length dimension of the blades 65, 66 is equal to or greater than the dimension of the long side 102a in cross-section of the small-diameter optical fiber cable 102 and less than the dimension of the long side 101a in cross-section of the large-diameter optical fiber cable 101. With this cable gripping structure 6, since multiple various optical fiber cables of different outside diameters can be gripped using the same size cable gripping structure 6, the amount that the blades 65, 66 bite into a large-diameter optical fiber cable 101 is greater than the amount that the blades 65, 66 bite into a small-diameter optical fiber cable 102. Since the small-diameter optical fiber cable 102 is gripped along the entire direction of the long side 102 in cross-section, there can be sufficient gripping force even though the amount that the blades 65, 66 bite in is smaller. Meanwhile, only a portion of the large-diameter optical fiber cable 101 is gripped in the direction of the long side 101a in cross-section, but adequate gripping is possible because the amount that the blades 65, 66 bit in is greater.

In the cable gripping structure 6 of the present embodiment, the pair of support walls 63, 64 possess thin parts 63d, 64d formed with a smaller wall thickness toward the tips 63e, 64 end and thick parts 63e, 64e formed with a larger wall thickness toward the base ends of the support walls 63, 64. Since making the base ends of the support walls 63, 64 from thick parts 63e, 64e makes the bearing resistance from the support walls greater than when the entire support wall is made thin, the gripping force from the blades 65, 66 can be increased. Thus, when inserting a small-diameter optical fiber cable 102, the gripping force on the small-diameter optical fiber cable 102 can be made even greater. Additionally, making the tips 63a, 64a ends of the support walls 63, 64 as thin parts 63d, 64d keeps the pressing force needed in the compression operation from getting too high compared with when the entire support wall is thick.

In the cable gripping structure 6 of the present embodiment, when external force is exerted on the support walls 63, 64, the strain is likely to concentrate in the boundary parts 67a, 67b between the thin parts 63d, 64d and the thick parts 63e, 64e, making these areas more likely to deform that the other areas. Forming such boundary parts 67a, 67b between the thin parts 63d, 64d and thick parts 63e, 64e in the area between the base of the support wall 63, 64 and the blades 65, 66 makes the support walls 63, 64 more easily deformed, which makes it possible to decrease the pressing force of large-diameter optical fiber cables 101.

The optical fiber connector 1 of the present embodiment is equipped with a mounting part 3 in which the optical fiber cable 100 is mounted and a cover part 5 that couples with the mounting part 3. The mounting part 3 is then constituted by at least one surface of the back end portion of the base part 11 in the connector body 2 being notched out, and the cover part 5 is equipped with a cable gripping structure 6 and is disposed so as to be rotatable relative to the mounting part 3, so as to cover the mounting part 3. Therefore, when installing an optical fiber cable 100 in the optical fiber connector 1, the operator merely performs an operation of rotating the cover part 5 with the optical fiber cable 100 mounted in the mounting part 3. Thus, the optical fiber cable 100 mounted in the mounting part is adequately gripped by the cable gripping structure 6 formed in the cover part 5.

In the optical fiber connector 1 of the present embodiment, a pressing part 36, which can press against an optical fiber cable, is provided in the floor surface 35 of the mounting part 3 that protrudes from the floor surface 35 and, in the state with the cover part 5 covering the mounting part 3, is positioned between the pair of support walls 63, 64. Therefore, in a state in which an optical fiber cable 100 is mounted on the pressing part 36, when the cover part 5 is coupled with the mounting part 3, the optical fiber cable 100 is pushed between the support walls 63, 64 by the pressing part 36. Thus, the optical fiber cable can be securely pressed between the blades 65, 66 formed on the support walls 63, 64 by the amount that the pressing part 36 protrudes.

In the optical fiber connector 1 of the present embodiment, a protrusion 69 is provided in the cover part 5, protruding between the pair of support walls 63, 64 from the base toward the tip thereof. Thus, even in cases in which an optical fiber cable 102 does not reach the base part 62 when the cover part 5 and the mounting part 3 are coupled, e.g., when installing a small-diameter optical fiber cable 102, the protrusion 69 is in contact with the optical fiber cable 102, thereby keeping the optical fiber cable 102 from shifting between the blades 65, 66 (between the support walls 63, 64).

An embodiment of the present invention has been detailed above, referring to the attached drawings, but the specific constitution is not limited to this embodiment and modifications may be made without departing from the scope of the present invention.

For example, an example was shown in which the cable gripping structure 6 is integrally formed in the cover part 5 of the optical fiber connector 6, but this example is not limiting. For example, the cable gripping structure may also be constituted formed as a separate entity from the optical fiber connector.

An example was also shown in which through holes 57a formed in the cover part 5 were coupled with shafts 37a formed on the mounting part 3, but this example is not limiting. For example, the mounting part and cover part may be constituted integrally formed, with this coupling part as a thin hinge structure. In this case, the cover part would be able to rotate relative to the mounting part around the part constituting the thin hinge as the rotational axis.

An example is also shown in which a large-diameter optical fiber cable 101 and a small-diameter optical fiber cable 102 are gripped by the cable gripping structure 6, but this example is not limiting, and this can also be applied to three or more different types of optical fiber cables of different outside diameters.

REFERENCE NUMERALS

1 . . . optical fiber connector, 2 . . . connector body, 3 . . . mounting part, 5 . . . cover part, 6 . . . cable gripping structure, 35 . . . floor surface, 36 . . . pressing part, 62 . . . base, 63, 64 . . . support walls, 63d, 64d . . . thin parts, 63e,

64*e* . . . thick parts, 65, 66 . . . blades, 67*a*, 67*b* . . . boundary parts, 69 . . . protrusion, 100 . . . optical fiber cable, 101 . . . optical fiber cable (first cable), 102 . . . optical fiber cable (second cable).

What it claimed is:

1. A cable gripping structure for securing an optical fiber cable in an optical fiber connector, comprising:
   a mounting part and a cover part rotatably connected to the mounting part wherein the cover part comprises:
   a base part;
   a pair of side walls extending from the base part; and
   a pair of support walls disposed opposite one another on the base part between the side walls, wherein the support walls are spaced apart from the side walls by lateral gaps and can flex outwardly into the lateral gaps to spread further apart from one another in order to accommodate large-diameter optical fibers; and
   blades for gripping the optical fiber cable disposed on the pair of support walls proximate to tip ends thereof and separated from base ends of the support walls such that the blades extend in a vertical direction relative to the base part and at a height away from the base part, with the base part being separated from proximal ends of the blades by a vertical gap.

2. The cable gripping structure of claim 1, wherein:
   the blades can grip a first cable, as well as a second cable in which a dimension of a long side or a short side in cross-section thereof is smaller than that of the first cable; and
   a length dimension of the blades is equal to or greater than the dimension of the long side in cross-section of the second cable, and is less than the dimension of the long side in cross-section of the first cable.

3. The cable gripping structure of claim 1, wherein the pair of support walls comprise a thin part in which a wall thickness formed toward the tip end of the support wall is small, and a thick part in which a wall thickness formed toward the base end of the support wall is greater than that of the thin part.

4. The cable gripping structure of claim 3, wherein a boundary part between the thin part and the thick part is formed between the base of the support wall and the blades.

5. An optical fiber connector into which an end of an optical fiber cable is installed, the optical fiber connector comprising:
   a connector body comprising the cable gripping structure of claim 1,
   wherein the mounting part is formed by at least one surface of a back end portion of the connector body being notched out.

6. The optical fiber connector of claim 5, wherein:
   a floor surface is provided in the mounting part opposite the tip ends of the support walls in a state with the cover part covering the mounting part; and
   a pressing part, capable of pressing the optical fiber cable, is provided in the floor surface protruding from the floor surface and located between the pair of support walls in the state with the cover part covering the mounting part.

7. The optical fiber connector of claim 5, wherein a protrusion extends from the cover part between the pair of support walls and protrudes from the base ends toward the tip ends thereof, wherein the protrusion supports a small-diameter optical fiber cable being gripped by the blades, preventing the small-diameter optical fiber cable from shifting out of position and wherein the protrusion is deformed when a large-diameter optical fiber cable is inserted between the blades.

8. The optical fiber connector of claim 6, wherein a protrusion is provided in the cover part between the pair of support walls, protruding from the base ends toward the tip ends thereof, wherein the protrusion supports a small-diameter optical fiber cable being gripped by the blades, preventing the small-diameter optical fiber cable from shifting out of position and wherein the protrusion is deformed when a large-diameter optical fiber cable is inserted between the blades.

9. The cable gripping structure of claim 2, wherein the pair of support walls comprise a thin part in which a wall thickness formed toward the tip end of the support wall is small, and a thick part in which a wall thickness formed toward the base end of the support wall is greater than that of the thin part.

10. The cable gripping structure of claim 9, wherein a boundary part between the thin part and the thick part is formed between the base of the support wall and the blades.

11. The cable gripping structure of claim 1, further comprising a latching mechanism to couple the mounting part and the cover part when the mounting part is covered by the cover part.

12. The cable gripping structure of claim 11, wherein the latching mechanism comprises a pair of latch parts disposed on the mounting part that fit into corresponding latch receptacles disposed on the cover part.

13. The cable gripping structure of claim 11, wherein the support walls can be pushed apart to accommodate different sized optical fibers.

14. The cable gripping structure of claim 3, wherein the thick parts are configured to exert a higher bearing resistance on an optical fiber than the thin parts of the support walls.

15. The cable gripping structure of claim 9, wherein the thick parts are configured to exert a higher bearing resistance on an optical fiber than the thin parts of the support walls.

16. The cable gripping structure of claim 1, wherein the mounting part has a U-shaped cross section and comprises a floor wall and a pair of side walls extending from the floor wall.

17. The cable gripping structure of claim 16, wherein the side walls of the mounting part are disposed between the support walls and the side walls of the cover part when the mounting part is covered by the cover part.

18. The cable gripping structure of claim 1, wherein the blades are inclined toward a front of the cable gripping structure.

19. The cable gripping structure of claim 1, wherein the base part, the pair of side walls, the blades, and the pair of support walls all comprise an integrally formed one-piece member.

* * * * *

UNITED STATES PATENT AND TRADEMARK OFFICE
CERTIFICATE OF CORRECTION

PATENT NO. : 10,241,279 B2
APPLICATION NO. : 15/915541
DATED : March 26, 2019
INVENTOR(S) : Akihiko Yazaki et al.

Page 1 of 1

It is certified that error appears in the above-identified patent and that said Letters Patent is hereby corrected as shown below:

In the Claims

Column 11, Line 9, Claim 1, delete "part" and insert -- part, --, therefor.

Signed and Sealed this
Eighteenth Day of February, 2020

Andrei Iancu
*Director of the United States Patent and Trademark Office*